(12) United States Patent
Li

(10) Patent No.: US 11,360,922 B2
(45) Date of Patent: Jun. 14, 2022

(54) THREE-IN-ONE MULTIMEDIA CABLE AND ELECTRONIC DRAWING BOARD SYSTEM

(71) Applicant: HANVON UGEE TECHNOLOGY CO., LTD., Guangdong (CN)

(72) Inventor: Yuanzhi Li, Guangdong (CN)

(73) Assignee: HANVON UGEE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/048,246

(22) PCT Filed: Jun. 15, 2018

(86) PCT No.: PCT/CN2018/091497
§ 371 (c)(1),
(2) Date: Oct. 16, 2020

(87) PCT Pub. No.: WO2019/205257
PCT Pub. Date: Oct. 31, 2019

(65) Prior Publication Data
US 2021/0165755 A1    Jun. 3, 2021

(30) Foreign Application Priority Data

Apr. 28, 2018  (CN) .......................... 201810397991.X

(51) Int. Cl.
*G06F 13/40* (2006.01)
*G06F 3/046* (2006.01)
(Continued)

(52) U.S. Cl.
CPC .......... *G06F 13/4027* (2013.01); *G06F 3/046* (2013.01); *G06F 3/14* (2013.01);
(Continued)

(58) Field of Classification Search
None
See application file for complete search history.

(56) References Cited

U.S. PATENT DOCUMENTS 10,289,589 B2 *   5/2019  Chhor ................. G06F 13/4022
2012/0012357 A1 * 1/2012  Horan ................. H04L 25/0278
                                                                174/103
(Continued)

FOREIGN PATENT DOCUMENTS

CN       202632260 A1    12/2012
CN       204118425 A1     1/2015
(Continued)

*Primary Examiner* — Henry Tsai
*Assistant Examiner* — Christopher A Bartels
(74) *Attorney, Agent, or Firm* — Warshaw Burstein, LLP

(57) ABSTRACT

Disclosed are a three-in-one multimedia cable and an electronic drawing board system. The three-in-one multimedia cable includes a USB-type-C plug, an HDMI plug, a USB-type-A plug, and a power supply plug, the USB-type-C plug is connected to the HDMI plug, the USB-type-A plug, and the power supply plug respectively. The electronic drawing board system includes the three-in-one multimedia cable, a USB-type-C socket, an analog switch, and an electromagnetic screen module, the USB-type-C plug of the multimedia cable is connected to the USB-type-C socket, an output end of the USB-type-C socket is connected to an input end of the analog switch, and an output end of the analog switch is connected to an input end of the electromagnetic screen module. The three-in-one multimedia cable can reduce the number of cables, which is convenient for users to use, and can be widely applied to the field of data cables.

8 Claims, 2 Drawing Sheets

(51) Int. Cl.
*G06F 3/14* (2006.01)
*H01R 12/53* (2011.01)
*H01R 24/60* (2011.01)
*H01R 107/00* (2006.01)
*G06F 13/42* (2006.01)

(52) U.S. Cl.
CPC ......... *G06F 13/4282* (2013.01); *H01R 12/53* (2013.01); *H01R 24/60* (2013.01); *G06F 2213/0042* (2013.01); *G06F 2213/40* (2013.01); *H01R 2107/00* (2013.01)

(56) References Cited

U.S. PATENT DOCUMENTS

| | | | | |
|---|---|---|---|---|
| 2012/0057075 | A1* | 3/2012 | Kabuto | H04N 21/431 |
| | | | | 348/E5.099 |
| 2012/0079140 | A1* | 3/2012 | Bar-Niv | G09G 5/006 |
| | | | | 710/16 |
| 2012/0238120 | A1 | 9/2012 | Huang | |
| 2013/0075149 | A1* | 3/2013 | Golko | H01R 13/658 |
| | | | | 174/359 |
| 2016/0364360 | A1* | 12/2016 | Lim | G06F 13/385 |
| 2017/0192923 | A1* | 7/2017 | Liu | G06F 13/385 |
| 2018/0356873 | A1* | 12/2018 | Regupathy | G06F 1/266 |
| 2019/0369708 | A1* | 12/2019 | K | G06F 1/266 |
| 2020/0019526 | A1* | 1/2020 | Wentroble | G06F 13/409 |
| 2020/0272404 | A1* | 8/2020 | Mu | G06F 3/04162 |
| 2020/0388970 | A1* | 12/2020 | Tsai | H01R 24/60 |
| 2021/0075244 | A1* | 3/2021 | Cho | H02J 7/007182 |

FOREIGN PATENT DOCUMENTS

| | | |
|---|---|---|
| CN | 205176841 A1 | 4/2016 |
| CN | 205944674 A1 | 2/2017 |
| CN | 206628685 A1 | 11/2017 |
| CN | 107453176 A1 | 12/2017 |

* cited by examiner

THREE-IN-ONE MULTIMEDIA CABLE AND ELECTRONIC DRAWING BOARD SYSTEM

TECHNICAL FIELD

The present invention relates to the field of data cables, and in particular, to a three-in-one multimedia cable and an electronic drawing board system.

BACKGROUND

An electronic drawing board has become a necessity for art workers. The electronic drawing board generally includes a display screen with touch control function. When in use, the electronic drawing board needs to be connected to a computer to obtain image information from the computer, transmit a touch control data to the computer, and obtain sufficient power supply from the computer or from other power sources. Currently, products on the market generally use one HDMI or VGA cable, one power supply cable and one USB cable to meet the above three requirements, respectively.

However, it is not convenient to use multiple cables for mobile tools such as electronic drawing board.

SUMMARY

In order to address the above technical problems, the present invention aims at providing a convenient three-in-one multimedia cable and an electronic drawing board system.

The first technical solution adopted by the present invention is as follows:

A three-in-one multimedia cable, including: a USB-type-C plug, an HDMI plug, a USB-type-A plug, and a power supply plug; wherein the USB-type-C plug includes A1 to A12 pins and B1 to B12 pins, wherein the A2 pin and the A3 pin form a first differential pin group, the B2 pin and the B3 pin form a second differential pin group, the A6 pin and the A7 pin form a third differential pin group, the B6 pin and the B7 pin form a fourth differential pin group, the A10 pin and the A11 pin form a fifth differential pin group, and the B10 pin and the B11 pin form a sixth differential pin group; the HDMI plug includes a seventh differential pin group, an eighth differential pin group, a ninth differential pin group, a tenth differential pin group, a hot plug detection pin, a serial data pin, a serial clock pin and a 5V power input pin; and the USB-type-A plug includes an eleventh differential pin group;

the seventh differential pin group is connected to the first differential pin group, the eighth differential pin group is connected to the second differential pin group, the ninth differential pin group is connected to the fifth differential pin group, the tenth differential pin group is connected to the six differential pin group, and the eleventh differential pin group is respectively connected to the third differential pin group and the fourth differential pin group; a positive power pin of the USB-type-A plug and a positive power pin of the power supply plug are both connected to at least one of the A4 pin, the B4 pin, the A9 pin, and the B9 pin of the USB-type-C plug; a ground pin of the USB-type-A plug, a ground pin of the power supply plug and a ground pin of the HDMI plug are all connected to at least one of the A1 pin, the B1 pin, the A12 pin and the B12 pin of the USB-type-C plug; the 5V power input pin, the hot plug detection pin, the serial data pin and the serial clock pin are all connected to at least one of the A5 pin, the B5 pin, the A8 pin and the B8 pin of the USB-type-C plug, and the 5V power input pin, the hot plug detection pin, the serial data pin and the serial clock pin are not connected to each other.

Further, the power supply plug is a USB-type-A plug.

Further, an adapter plate is arranged in the HDMI plug, and the USB-type-C plug is respectively connected to the HDMI plug, the USB-type-A plug and the power supply plug through the adapter plate.

Further, the hot plug detection pin is connected to the A5 pin, and the 5V power input pin is connected to the B5 pin.

Further, the serial data pin is connected to the A8 pin, and the serial clock pin is connected to the B8 pin.

Further, one of the seventh differential pin group, the eighth differential pin group, the ninth differential pin group, and the tenth differential pin group is a differential clock pin group.

Further, the eleventh differential pin group includes a D+ pin and a D− pin of the USB-type-A plug, where the D+ pin is connected to the A6 pin and the B6 pin, and the D− pin is connected to the A7 pin and B7 pin.

The second technical solution adopted by the present invention is as follows:

An electronic drawing board system, including: a USB-type-C socket, an analog switch, an electromagnetic screen module and a three-in-one multimedia cable; wherein a USB-type-C plug of the multimedia cable is connected to the USB-type-C socket, an output end of the type-C socket is connected to an input end of the analog switch, and an output end of the analog switch is connected to an input end of the electromagnetic screen module.

The three-in-one multimedia cable of the present invention has the following beneficial effects: the three-in-one multimedia cable includes a USB-type-C plug, an HDMI plug, a USB-type-A plug and a power supply plug, and integrates three connecting cables with respective functions of video data transmission, data control transmission and power supply into a USB-type-C plug, so that users do not need to use multiple cables when using the electronic drawing board, which is convenient for the users to use.

The electronic drawing board system of the present invention has the following beneficial effects: the electronic drawing board system includes the three-in-one multimedia cable, so that users do not need to use multiple cables when using the electronic drawing board, which is convenient for the users to use. In addition, the electronic drawing board system is further provided with an analog switch, which can automatically switch the connection relationship between the USB-type-C socket and the electromagnetic screen module according to an insertion direction of the USB-type-C plug of the three-in-one multimedia cable, and make it more convenient for the users to use.

DETAILED DESCRIPTION

Figure 1:
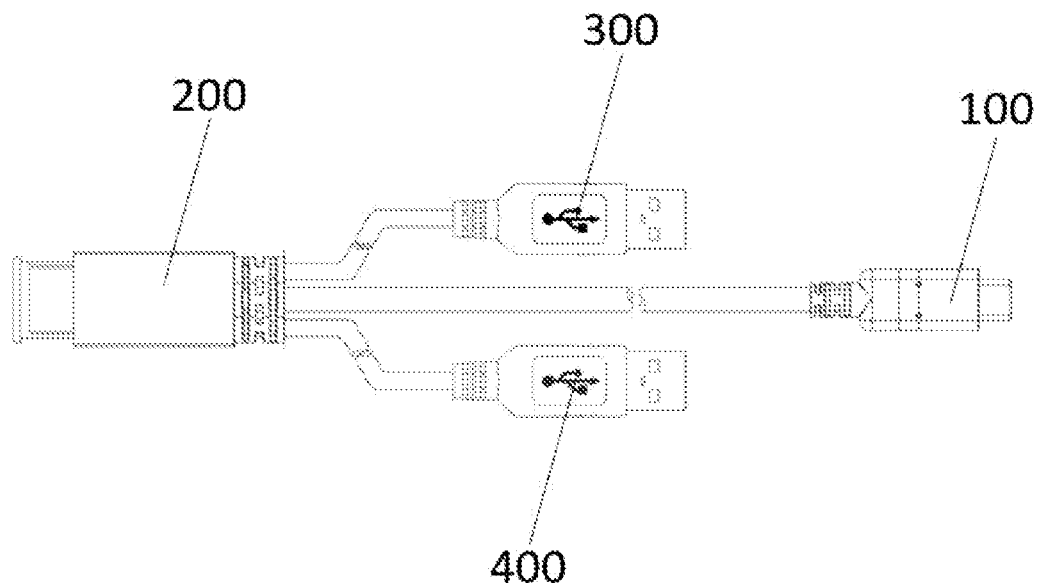
FIG. 1 is an appearance structure diagram of a three-in-one multimedia cable according to the present invention.

Referring to FIG. 1, a three-in-one multimedia cable, including a USB-type-C plug, an HDMI plug, a USB-type-A plug and a power supply plug, where the USB-type-C plug includes A1 to A12 pins and B1 to B12 pins, wherein the A2 pin and the A3 pin form a first differential pin group, the B2 pin and the B3 pin form a second differential pin group, and the A6 pin and the A7 pin form a third differential pin group, the B6 pin and the B7 pin form a fourth differential pin group, the A10 pin and the A11 pin form a fifth differential pin group, and the B10 pin and the B11 pin form a sixth differential pin group; the HDMI plug includes a seventh differential pin group, an eighth differential pin group, a ninth differential pin group, a tenth differential pin group, a hot plug detection pin, a serial data pin, and a serial clock pin and a 5V power input pin; and the USB-type-A plug includes an eleventh differential pin group;

the seventh differential pin group is connected to the first differential pin group, the eighth differential pin group is connected to the second differential pin group, the ninth differential pin group is connected to the fifth differential pin group, the tenth differential pin group is connected to the six differential pin group, and the eleventh differential pin group is respectively connected to the third differential pin group and the fourth differential pin group; a positive power pin of the USB-type-A plug and a positive power pin of the power supply plug are both connected to at least one of the A4 pin, the B4 pin, the A9 pin, and the B9 pin of the USB-type-C plug; a ground pin of the USB-type-A plug, a ground pin of the power supply plug and a ground pin of the HDMI plug are all connected to at least one of the A1 pin, the B1 pin, the A12 pin and the B12 pin of the USB-type-C plug; the 5V power input pin, the hot plug detection pin, the serial data pin and the serial clock pin are all connected to at least one of the A5 pin, the B5 pin, the A8 pin and the B8 pin of the USB-type-C plug, and the 5V power input pin, the hot plug detection pin, the serial data pin and the serial clock pin are not connected to each other. Generally, in order to ensure the power supply capacity and anti-interference ability of the multimedia cable, the A4 pin, the B4 pin, the A9 pin and the B9 pin are all connected to the positive power pin of the USB-type-A plug and the positive power pin of the power plug. Similarly, the A1 pin, the B1 pin, the A12 pin, and the B12 pin are all connected to the ground pin of the USB-type-A plug, the ground pin of the power supply plug, and the ground pin of the HDMI plug. However, those skilled in the art may only connect some pins as appropriate.

Referring to FIG. 1, further, as a preferred embodiment, the power supply plug is a USB-type-A plug.

Further, as a preferred embodiment, an adapter plate is arranged in the HDMI plug, and the USB-type-C plug is respectively connected to the HDMI plug, the USB-type-A plug and the power supply plug through the adapter plate.

Further, as a preferred embodiment, the hot plug detection pin is connected to the A5 pin, and the 5V power input pin is connected to the B5 pin.

Further, as a preferred embodiment, the serial data pin is connected to the A8 pin, and the serial clock pin is connected to the B8 pin.

Further, as a preferred embodiment, one of the seventh differential pin group, the eighth differential pin group, the ninth differential pin group, and the tenth differential pin group is a differential clock pin group.

Further, as a preferred embodiment, the eleventh differential pin group includes a D+ pin and a D− pin of the USB-type-A plug, wherein the D+ pin is connected to the A6 pin and the B6 pin, and the D− pin is connected to the A7 pin and the B7 pin.

Figure 3:
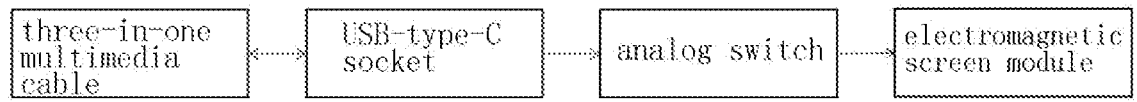
FIG. 3 is a module block diagram of an electronic drawing board system according to the present invention.

Referring to FIG. 3, an electronic drawing board system, including a USB-type-C socket, an analog switch, an elec-tromagnetic screen module and a three-in-one multimedia cable, wherein a USB-type-C plug of the multimedia cable is connected to the USB-type-C socket, an output end of the USB-type-C socket is connected to an input end of the analog switch, and an output end of the analog switch is connected to an input end of the electromagnetic screen module.

The present invention will be further described below with reference to the drawings and specific embodiments of the description.

Referring to FIG. 1, a three-in-one multimedia cable is disclosed, which includes a USB-type-C plug 100, an HDMI plug 200, a USB-type-A plug 300, and a power supply plug 400. An adapter plate is arranged in the HDMI plug 200, and the USB-type-C plug 100 is respectively connected to the HDMI plug 200, the USB-type-A plug 300 and the power supply plug 400 through the adapter plate in the HDMI plug 200. Except for the HDMI plug, other plugs are connected to the adapter plate through cables (the HDMI plug may be directly welded to the adapter plate). The adapter plate is arranged in the HDMI plug 200 because the HDMI plug has a large volume and can accommodate a PCB board.

The purpose of adding the power supply plug 400 in the present invention is to provide a large enough current for the electronic drawing board (generally the power supply of a USB interface of a computer does not exceed 500 mA, which is not large enough to drive the electronic drawing board). The power supply plug 400 may be implemented by a USB-type-A plug, so as to be directly plugged into the USB of the computer, power bank or charging socket to obtain current.

The connection relationship between multiple plugs in this embodiment is shown in Table 1.

TABLE 1

| pin | definition | pin | definition |
|-----|------------|-----|------------|
| A1  | GND | B1 | GND |
| A2  | HDMI-D0+ (positive phase of data differential pin) | B2 | HDMI-CLK+ (positive phase of clock differential pin) |
| A3  | HDMI-D0− (negative phase of data differential pin) | B3 | HDMI-CLK+ (positive phase of clock differential pin) |
| A4  | 5 V IN | B4 | 5 V IN |
| A5  | HDMI-HPD (hot plug detection pin) | B5 | HDMI-5 V (5 V power input pin) |
| A6  | USB-D+ (positive phase of data differential pin) | B6 | USB-D+ (positive phase of data differential pin) |
| A7  | USB-D− (negative phase of data differential pin) | B7 | USB-D− (negative phase of data differential pin) |
| A8  | HDMI-SCL (serial clock pin) | B8 | HDMI-SDA (serial data pin) |
| A9  | 5 V IN | B9 | 5 V IN |
| A10 | HDMI-D2− (negative phase of differential pin) | B10 | HDMI-D1− (negative phase of differential pin) |
| A10 | HDMI-D2+ (positive phase of differential pin) | B11 | HDMI-D1+ (positive phase of differential pin) |
| A12 | GND | B12 | GND |

Figure 2:
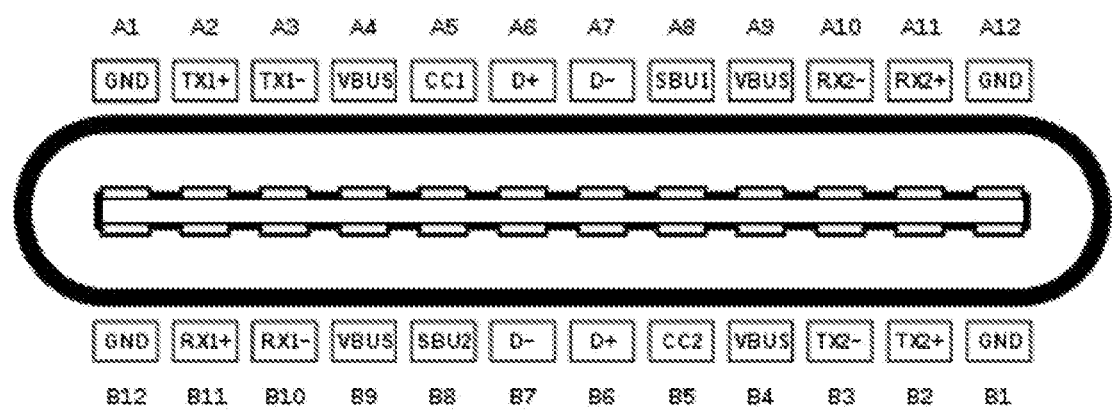
FIG. 2 is a definition diagram of standard pins of USB-type-C.

In Table 1, the header item "pin" refers to pins on the USB-type-C plug, and the header item "definition" refers to pins of the HDMI plug, the USB-type-A plug or the power supply plug respectively connected to pins of the USB-type-C plug. In Table 1, the items prefixed with "USB" indicate pins of the USB-type-A plug, and the items prefixed with "HDMI" indicate pins of the HDMI plug. The plugs have a common ground connection, and "5V IN" indicates the positive power pin of the plugs except the HDMI plug. In Table 1, A2 and A3, B2 and B3, A6 and A7, B6 and B7, A10 and A11, and B10 and B11 are differential data pin groups. Referring to Table 1 and FIG. 2, it can be known that the connection relationship between the USB-type-A plug and the USB-type-C plug of the present invention does not change the standard pin definition of the USB-type-C, so it may be used as ordinary USB data cable in the present invention. Furthermore, in the present invention, the remaining differential data pins of the USB-type-C and other pins are also utilized to realize the integration of the HDMI interface. Since the USB-type-C plug has no distinction between the front and the back, and the pins of HDMI in this embodiment are not symmetrically distributed, the electronic drawing board using the data cable in this embodiment may be provided with an analog switch, which is used to detect a 5V power input of the HDMI interface, and determine to switch the internal connection relationship of the electronic drawing board according to the position of the 5V power input pin of the HDMI plug. For example, when the 5V power input pin is connected to the B5 pin, the analog switch only needs to detect which of the A5 pin and the B5 pin of the USB-type-C plug is 5V to know the insertion direction of the USB-type-C plug. At this time, the analog switch switches the connection relationship between the USB-type-C plug and the electronic drawing board display screen according to the detection result.

In addition, in other embodiments, the connection relationship between the HDMI plug and the USB-type-C plug may be adjusted according to actual needs. For example, HDMI-SCL and HDMI-SDA may be interchanged, or the positions of multiple differential pins may be interchanged.

Referring to FIG. 3, an electronic drawing board system is provided, which includes the three-in-one multimedia cable as shown in FIG. 1, a USB-type-C socket, an analog switch and an electromagnetic screen module. A USB-type-C plug of the multimedia cable is connected to the USB-type-C socket, an output end of the USB-type-C socket is connected to an input end of the analog switch, and an output end of the analog switch is connected to an input end of the electromagnetic screen module.

Figure 4:
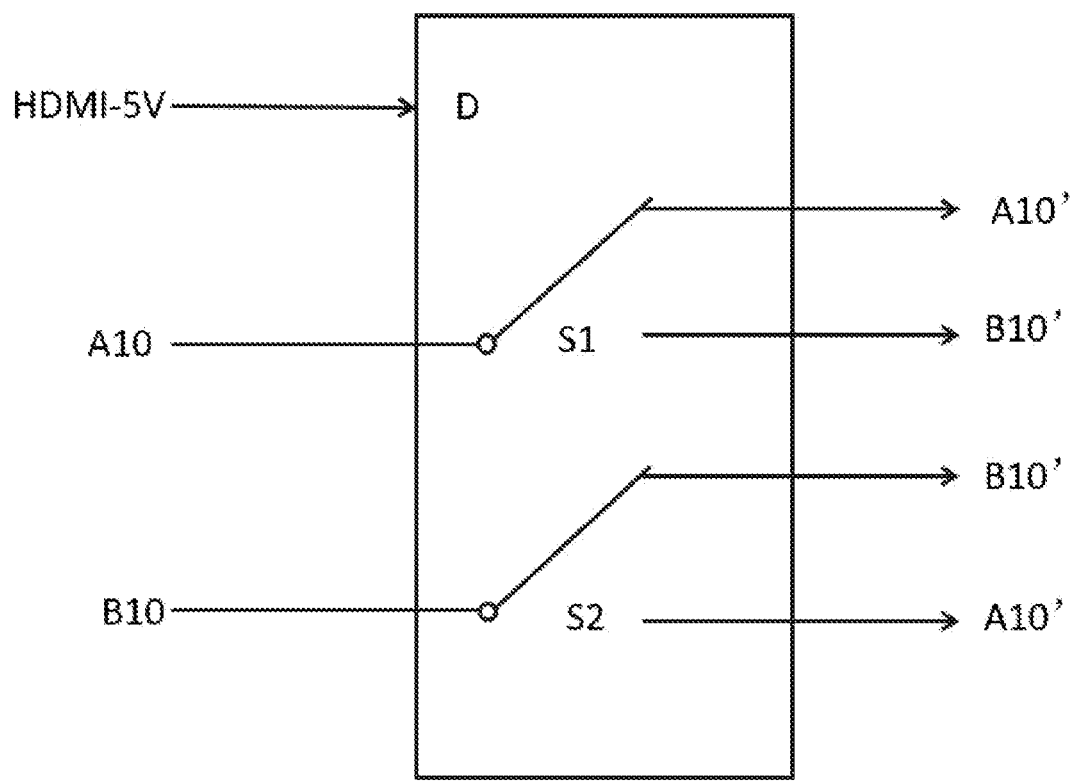
FIG. 4 is a schematic diagram of an analog switch according to the present invention.

FIG. 4 shows a schematic diagram of an analog switch. A switch S1 and a switch S2 are controlled by an input level of an interface D. When the interface D is connected to HDMI-5V in FIG. 4, the states of the switch S1 and the switch S2 are shown in FIG. 4. The A10 pin of the USB-type-C plug (socket) is connected to an A10' pin of the electromagnetic screen module of the electronic drawing board, and the B10 pin is connected to a B10' pin. When the USB-type-C plug is inserted in the reverse direction and the interface D does not detect HDMI-5V high level (or when other detection interfaces detect HDMI-5V high level), the states of the switch S1 and the switch S2 will change, that is, the A10 pin is connected to the B10' pin, and the B10 pin is connected to the A10' pin. In this embodiment, the connection relationship between the multimedia cable and the electromagnetic screen module is automatically switched by detecting the position of the HDMI-5V, so that the USB-type-C interface may be inserted and used regardless of the front and back, which is further convenient for the users to use. After the cable is designed, the function of its pin is determined. Therefore, in practical applications, those skilled in the art only need to redesign the connection relationship between the analog switch and the USB-type-C socket according to the actual situation. In the present invention, the specific connection relationship between the analog switch and the USB-type-C socket and the specific connection relationship between the analog switch and the electromagnetic screen module are not restricted, and the specific model and quantity of the analog switch are not restricted.

The above is a detailed description of the preferred embodiments of the present invention, but the present invention is not limited to the embodiments. Those skilled in the art may make various equivalent modifications or substitutions without departing from the concept of the present invention, and these equivalent modifications or substitutions are all included in the scope defined by the claims of this application.

What is claimed is:

1. A three-in-one multimedia cable, comprising:
a USB-type-C plug;
an HDMI plug;
a USB-type-A plug; and
a power supply plug;
wherein the USB-type-C plug comprises A1 to A12 pins and B1 to B12 pins, wherein the A2 pin and the A3 pin form a first differential pin group, the B2 pin and the B3 pin form a second differential pin group, the A6 pin and the A7 pin form a third Differential pin group, the B6 pin and the B7 pin form a fourth differential pin group, the A10 pin and the A11 pin form a fifth differential pin group, and the B10 pin and the B11 pin form a sixth differential pin group;
the HDMI plug comprises a seventh differential pin group, an eighth differential pin group, a ninth differential pin group, a tenth differential pin group, a hot plug detection pin, a serial data pin, and a serial clock pin and a 5V power input pin; and the USB-type-A plug comprises an eleventh differential pin group;
wherein the seventh differential pin group is connected to the first differential pin group, the eighth differential pin group is connected to the second differential pin group, the ninth differential pin group is connected to the fifth differential pin group, the tenth differential pin group is connected to the six differential pin group, and the eleventh differential pin group is respectively connected to the third differential pin group and the fourth differential pin group;
wherein a positive power pin of the USB-type-A plug and a positive power pin of the power supply plug are both connected to at least one of the A4 pin, the B4 pin, the A9 pin and the B9 pin of the USB-type-C plug;
wherein a ground pin of the USB-type-A plug, a ground pin of the power supply plug and a ground pin of the HDMI plug are all connected to at least one of the A1 pin, the B1 pin, the A12 pin and the B12 pin of the USB-type-C plug; the 5V power input pin, the hot plug detection pin, the serial data pin, and the serial clock pin are all connected to one of the A5 pin, the B5 pin, the A8 pin, and the B8 pin of the USB-type-C plug.

2. The three-in-one multimedia cable of claim 1, wherein the power supply plug is a USB-type-A plug.

3. The three-in-one multimedia cable of claim 1, wherein an adapter plate is arranged in the HDMI plug, and the USB-type-C plug is respectively connected to the HDMI plug, the USB-type-A plug and the power supply plug through the adapter plate.

4. The three-in-one multimedia cable of claim 1, wherein the hot plug detection pin is connected to the A5 pin, and the 5V power input pin is connected to the B5 pin.

5. The three-in-one multimedia cable of claim 1, wherein the serial data pin is connected to the A8 pin, and the serial clock pin is connected to the B8 pin.

6. The three-in-one multimedia cable of claim 1, wherein one of the seventh differential pin group, the eighth differential pin group, the ninth differential pin group and the tenth differential pin group is a differential clock pin group.

7. The three-in-one multimedia cable of claim 1, wherein the eleventh differential pin group comprises a D+ pin and a D− pin of the USB-type-A plug, wherein the D+ pin is connected to the A6 pin and the B6 pin, and the D− pin is connected to the A7 pin and the B7 pin.

8. An electronic drawing board system, comprising:
a USB-type-C socket;
an analog switch;
an electromagnetic screen module; and
the three-in-one multimedia cable of claim 1;
wherein a USB-type-C plug of the multimedia cable is connected to the USB-type-C socket, an output end of the USB-type-C socket is connected to an input end of the analog switch, and an output end of the analog switch is connected to an input end of the electromagnetic screen module;
wherein the analog switch is configured to detect a position of a pin of the USB-type-C plug connected to the 5V power input pin, and switch a connection relationship between the USB-type-C socket and the electromagnetic screen module according to a detection result.

* * * * *